US005541380A

United States Patent [19]

Ogden et al.

[11] Patent Number: 5,541,380

[45] Date of Patent: Jul. 30, 1996

[54] BRAIDED CABLE SOLIDIFICATION

[75] Inventors: Christopher Ogden, Cary; John A. Sider, Palatine; Dennis Lindsay, Carpentersville; Son Nguyen, Rolling Meadows, all of Ill.

[73] Assignee: Methode Electronics, Inc., Chicago, Ill.

[21] Appl. No.: 307,945

[22] Filed: Sep. 16, 1994

[51] Int. Cl.[6] .............................. B23K 11/11; B23K 11/16

[52] U.S. Cl. ......................... 219/56; 219/56.1; 219/56.22

[58] Field of Search .......................... 219/56, 56.1, 56.22

[56] References Cited

U.S. PATENT DOCUMENTS

| | | | |
|---|---|---|---|
| 3,333,083 | 7/1967 | Brunstetter et al. | 219/56.22 |
| 4,922,072 | 5/1990 | Topel et al. | 219/56.1 |
| 5,140,122 | 8/1992 | Mitnikoff | 219/56.1 |
| 5,155,326 | 10/1992 | Whims et al. | 219/85.22 |

*Primary Examiner*—Teresa J. Walberg
*Assistant Examiner*—J. Pelham
*Attorney, Agent, or Firm*—David L. Newman

[57] ABSTRACT

A flexible current carrying cable is provided comprising a cable and an end portion of the cable being solidified wherein the end portion is compressed into a unitary member having reduced voids and enabling brazing of the end portion to a current carrying apparatus.

A method of forming a current carrying cable comprises the steps of inserting an end of a cable into a spot welding machine, solidifying the end of the cable within the spot welding machine at 1100° F.–2000° F. at 10–100 psi. An alternative embodiment of the present invention includes an oxidation bump.

13 Claims, 4 Drawing Sheets

BRAIDED CABLE SOLIDIFICATION

BACKGROUND OF THE INVENTION

This invention pertains to braided cable and, in particular, braided cable having a terminated end and a method of terminating the end of a braided cable via solidification.

Braided cables are used for many applications including carrying current within or between electrical equipment. The use of braided cable to carry current is generally used due to the flexibility of the cable which allows bending of the cable in multiple orientations due to the braided arrangement of the cable. Also, the use of annealed copper in the braided cable is common which also provides for flexibility. However, the use of the braided cable is disadvantageous due to the multiple exposed fibers at the ends of the braided cable. The unfinished ends of a braided cable cannot be readily attached to a current receiving or providing apparatus. Attempts to braze an unfinished braided cable end directly to an apparatus are likely to fail because the widely spaced fibers of the braided cable will wick all of the brazing material into the braided cable reducing the flexibility of the cable.

Prior methods of finishing or terminating the ends of braided cables in order to allow the brazing of the ends of the cables to apparatus include attaching a ferrule over the end of the braided cable. As described in U.S. Pat. No. 994,818, the ferrule was generally a metal or copper sleeve which was placed over and compacted to the end. The use of a ferrule to terminate a braided cable is inefficient and difficult to accomplish. The additional ferrule part increases the cost of the terminated cable and requires special machinery to compact the ferrule to the end of the cable. The use of a ferrule also provides a cable with excess resistivity which reduces the desired current flow in the braided cable. Further, the ferrule after compaction has gaps between the ferrule and the cable which further reduce the voltage carded by the cable and are required to be filled in with solder paste or other material.

U.S. Pat. Nos. 4,922,072 and 3,333,083, describe the welding of insulated wires. Other methods of terminating cables included sonic welding which have the disadvantage that the terminated ends degrade and do not allow for adequate attachment of the cable to a substrate or apparatus. Such prior art welding methods fail to take into account modern welding equipment and the great advantages gained therefrom in providing an improved solidified braided cable which is quickly and easily formed having a lack of voiding areas, is water-proof, sustaining no physical degradation after sustaining gmat pull forces, vibration and torquing and providing inconsequential voltage drops.

A new and improved terminated braided cable is provided by the present invention which avoids the need to attach a ferrule or other crimping device and allows the terminated braided cable to be attached directly to apparatus with improved current conduction and cost savings.

It is an object of the present invention to provide a braided cable which may be successfully attached to apparatus without the use of additional parts to terminate the cable.

It is another object of the present invention to provide a braided cable which may be terminated quickly and inexpensively.

It is a further object of the present invention to provide a braided cable which is terminated in a manner which provides a limited voltage drop.

It is a another object of the present invention to provide a braided cable which provides for minimal water absorption.

It is further object of the present invention to provide a terminated end portion having maximum mechanical strength.

It is another object of the present invention to provide a braided cable in which solder will not wick beyond end portions of the cable.

SUMMARY OF THE INVENTION

In order to solve the above and other problems, a braided cable is provided having terminated end solidified wherein the end portion includes a reduced cross-section and wherein fibers of the end portion are in a compacted state. The end portion of the braided cable is solidified by a method of applying heat comprising the steps of inserting the end portion in a spot welder at 1100° F.–2000° F. at 10–100 psi. Customized tips of the spot welder provide the desired size and shape of the terminated end portion. An oxidation bump restricts the wicking of solder.

These and other features of the invention are set forth below in the following detailed description of the presently preferred embodiments.

DETAILED DESCRIPTION OF THE PRESENTLY PREFERRED EMBODIMENTS

Figure 1:
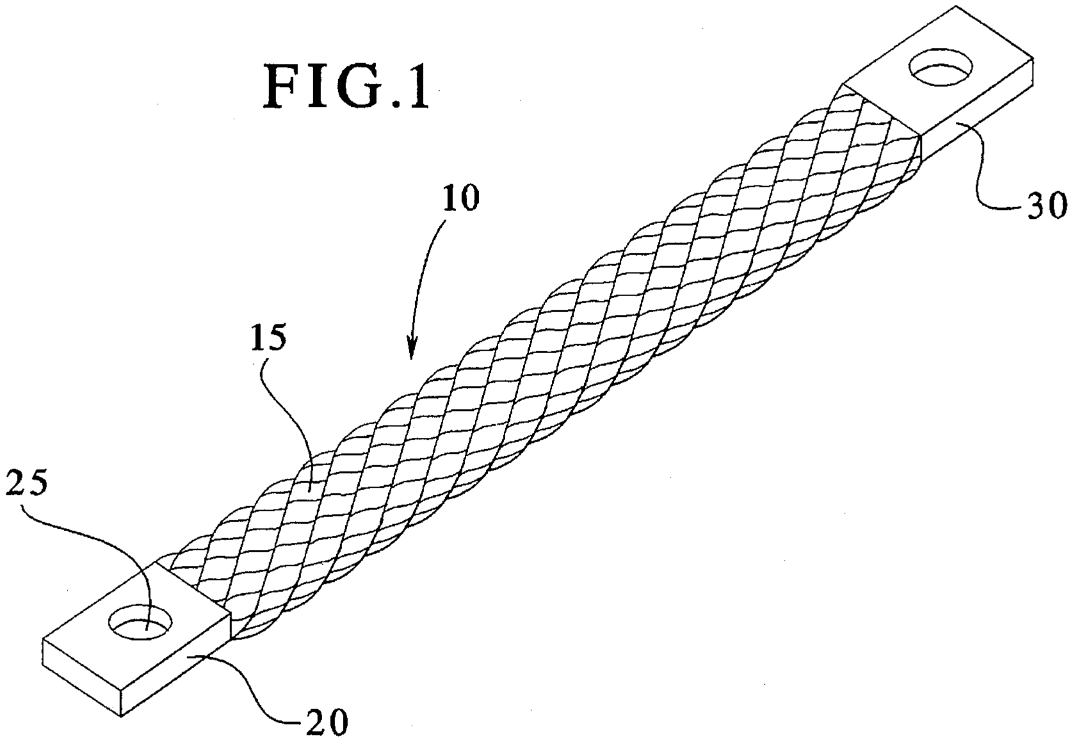
FIG. 1 is a perspective view of a braided cable having solidified ends.

Turning to FIG. 1, a braided cable 10 is shown having first end 20 and second end 30. Individual fibers 15 are braided to provide a flexible cable 10. In a preferred embodiment annealed copper cable is used. A cable 10 of any shape, width or thickness may be terminated by the process of this invention. A cable 10 may also be comprised of any material including tin-coated, nickel-coated or copper cables. The first end 20 includes hole 25 which is used for attaching the end 20 to an apparatus. Any size or shape hole may be included. First end 20 may be connected to a current originating apparatus and second end 30 of cable 10 may be connected to a current receiving apparatus. Lipon attachment of the cable, current is carried from the first end 20 to the second end 30.

Figure 2:
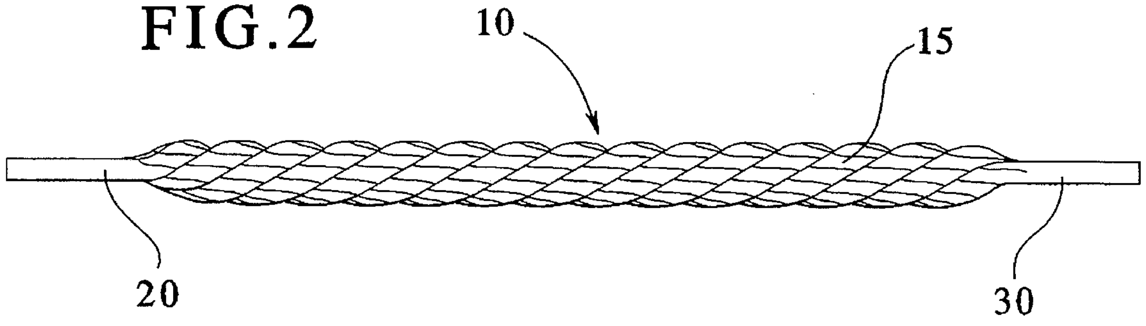
FIG. 2 is a side elevation view of a braided cable having solidified ends.

Turning to FIG. 2, cable 20 is shown having first end 20 and second end 30. The fibers 15 of the cable 10 are braided to form the cable 10. Ends 20,30 are solidified to provide a terminated end which is compacted into a solid end portion 20,30 which may be brazed directly to an apparatus. This may be accomplished without adding an additional piece such as a ferrule or needing to crimp the braided cable. The end portion 20,30 may also be attached to the apparatus by ultrasonically welding the end portion to the apparatus.

In a preferred method of solidifying the end portions 20,30 of the cable 10, a Peer 150 KVA spot welder was modified by adding a Unitrol 9180-C thermo feedback control unit. The thermo feedback control unit allows the spot welder to ramp-up to a maximum power and rolls back the power at a specified temperature setting and maintains the desired temperature setting. An end of the cable was placed in the spot welder. The spot welder was set to between 1100° F. and 2000° F. and 10 to 100 psi. These settings varied depending on the thickness and shape of the cable being terminated. The cable was held under the spot welder for between one-half second and two seconds to provide a solidified first end 20. For thicker cables, the cable must be rotated for solidifying a first side and then a second side. This process was repeated to provide a solidified second end 30. After solidification ends 20,30 may be trimmed to provide a clean end portion.

The spot welder was further modified to include custom weld tips. These tips are customized for the specific terminated shape of the cable desired. The tips have recessed areas so that placement of the end portions 20,30 therebetween terminate and solidify the ends in a single, quick, method. The use of the spot welder with customized tips is a vast improvement over prior art methods because it provides for quick and highly finished solidified ends. In a first application of this process, a cable having end dimensions of a width of 0.600 inch ±0.020 and thickness of 0.086 inch ±0.015 was solidified to a width of 0.552 inch ±0.002 and a thickness of 0.062 inch +0.002. A second application of the process of the present invention, a strap having an initial end width of 0.093 inch ±0.0005 and thickness of 0.016 inch ±0.001 was solidified to have a width of 0.103 inch ±0.002 and a thickness of 0.0105 inch +0.0005. It should be noted that the width of the solidified end was greater than before solidification. This result was achieved by coordination of the control unit of the spot welder and the shape of the custom weld tips of the spot welder.

This process provided for solidified cable ends which also have superior performance characteristics over the prior art ferrule crimped cables. The solidified cable ends of military specification MIL-T-135 13B(AT) provide voltage drop measurements that do not exceed 5 millivolts when a current of 205 amps is passed and provide a reduced voltage drop of less than 2.5 mV; compared to the ferrule crimped cables which exceed 2.5 mV. The solidified cable ends do not exceed by more than 9° F. the temperature of the braid material when 205 amps is passed. The solidified cable end does not exceed by more than 18° F. the temperature of the attached braid when connected to a circuit so that 256 amps could pass through, return to room temperature and pass a current of 410 amps for a period of five minutes, and the solidified ends exhibit better voltage drop measurements than ferrule crimped cables. The solidified cable ends withstand a minimum mechanical strength pull of 485 pounds pull force without breaking or becoming distorted. The solidified end may sustain a minimum pull force of approximately 485 pounds after being vibrated for one hour in each of three mutually perpendicular axes at an amplitude of 0.060 inches and a frequency of 10–55 to 10 hertz, with a frequency range accomplished once each minute and brake at the braid as opposed to the ferrule crimped cable in which the ferrule pulls from the braid. The solidified end withstands a bolt being torqued onto it at a torque of 100 inch pounds without physical degradation. The solidified end provides for a water proof area showing no evidence of water absorption, whereas the ferrule crimp will absorb water. The solidified crimp exhibits very little voiding whereas the ferrule crimp has substantial voiding.

Figure 3:
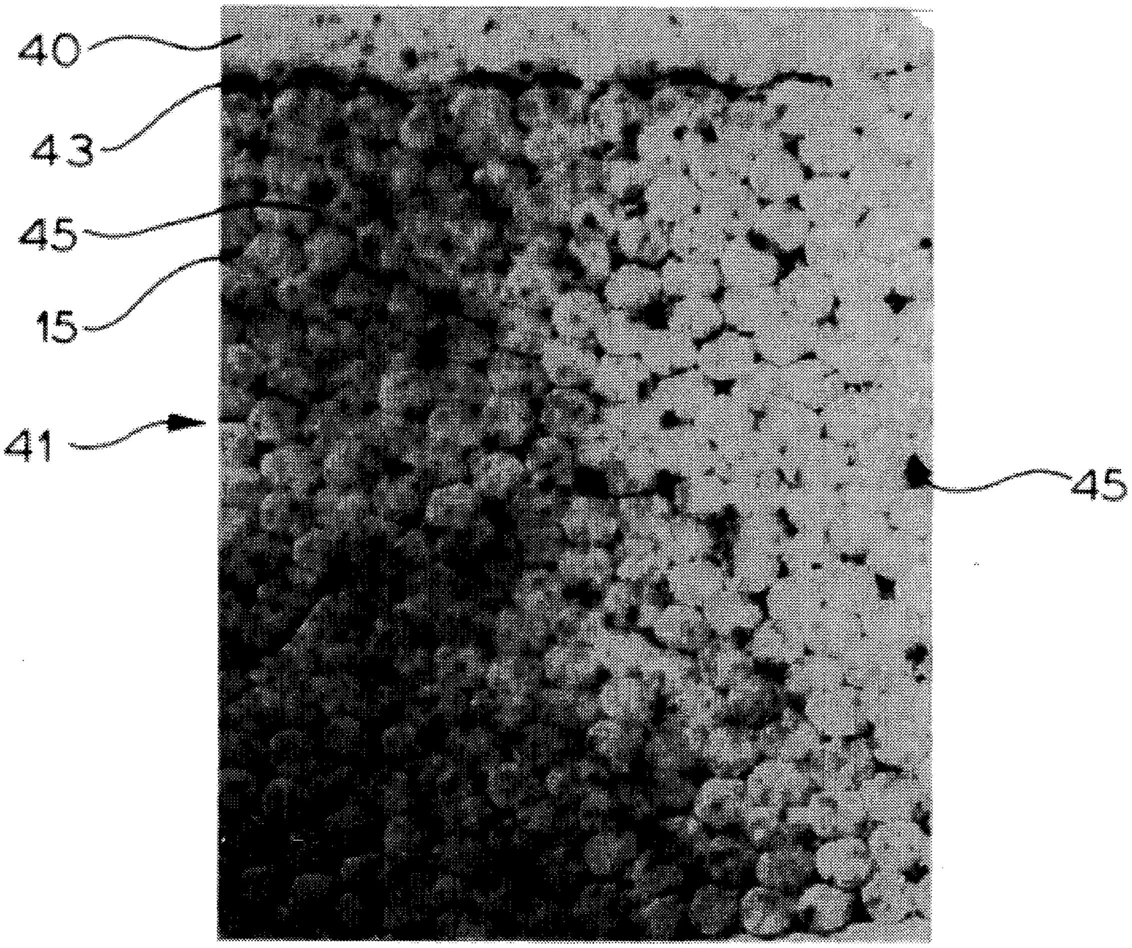
FIG. 3 (PRIOR ART)
FIG. 3 is a photocopy of an enlarged micrograph of a prior art termination of a braided cable.

FIG. 3 is a cross-sectional view enlarged fifty times of a prior art cable having a ferrule terminated thereon. The ferrule 40 is shown surrounding the cable 41. The cable comprises individual fibers 15. The ferrule 40 is compacted around the cable 41. The process of terminating the ferrule 40 onto the cable 41 leaves a gap 43 between the ferrule and the cable 41. The gap 43 causes a voltage drop when current is transferred from the cable 41 to the ferrule 40. As well, the fibers 15 of the cable 41 are loosely oriented so that voids 45 occur between the fibers 15. The voids 45 and gap 43 also allow for water absorption which causes water condensation.

Figure 4:
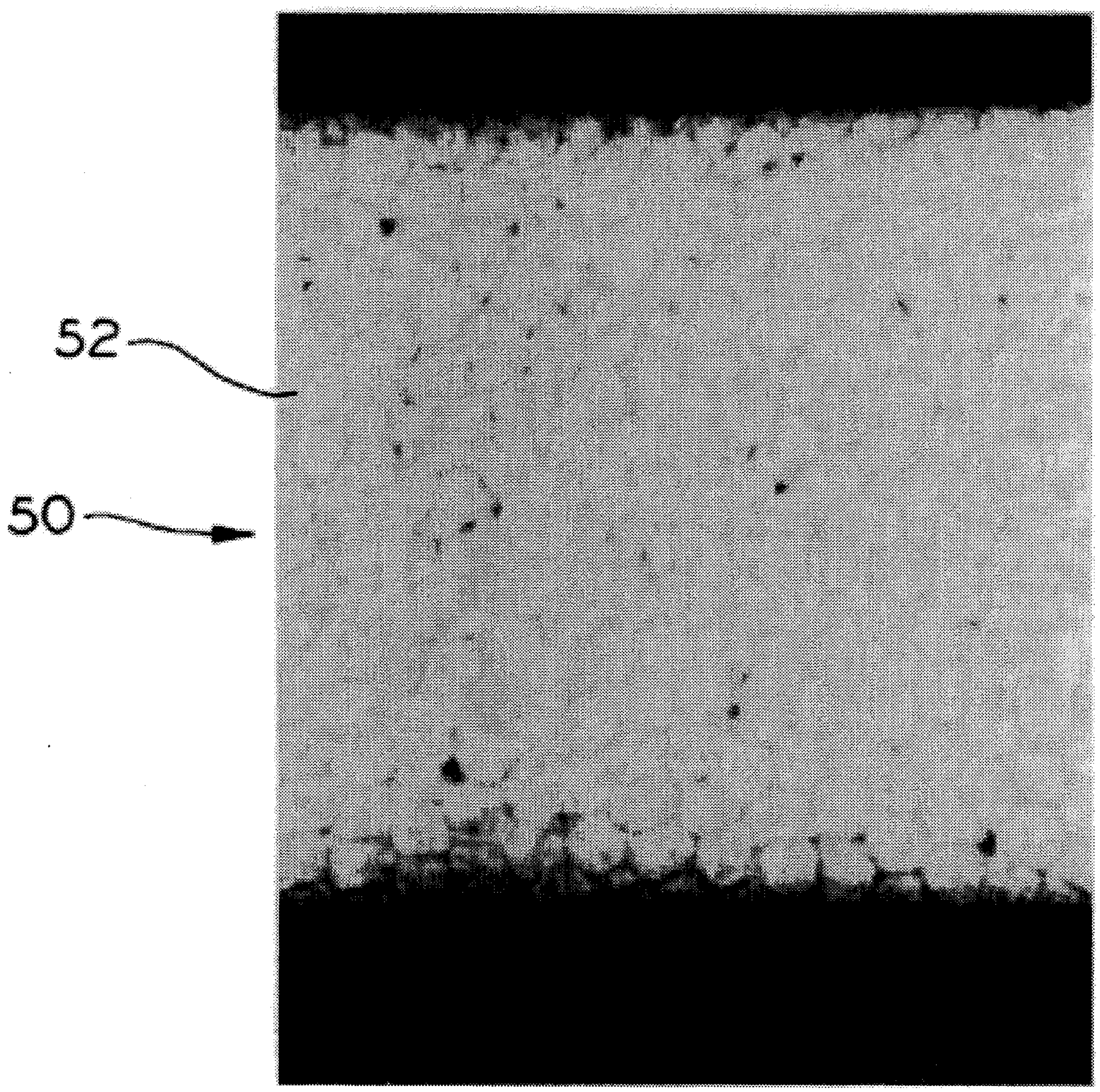
FIG. 4 is an enlarged micrograph of a terminated end portion of a braided cable.

FIG. 4 is a cut-away view of a solidified cable of the present invention enlarged fifty times wherein the cable 50 includes fibers 52 which are closely compacted. The use of the solidification to terminate the end portion of the cable 50 reduces the gaps 43 and voids 45 which occurred in the prior art (FIG. 3). This solidified cable may be attached to a substrate via brazing, bolting, ultrasonic welding or soldering.

Figure 5:
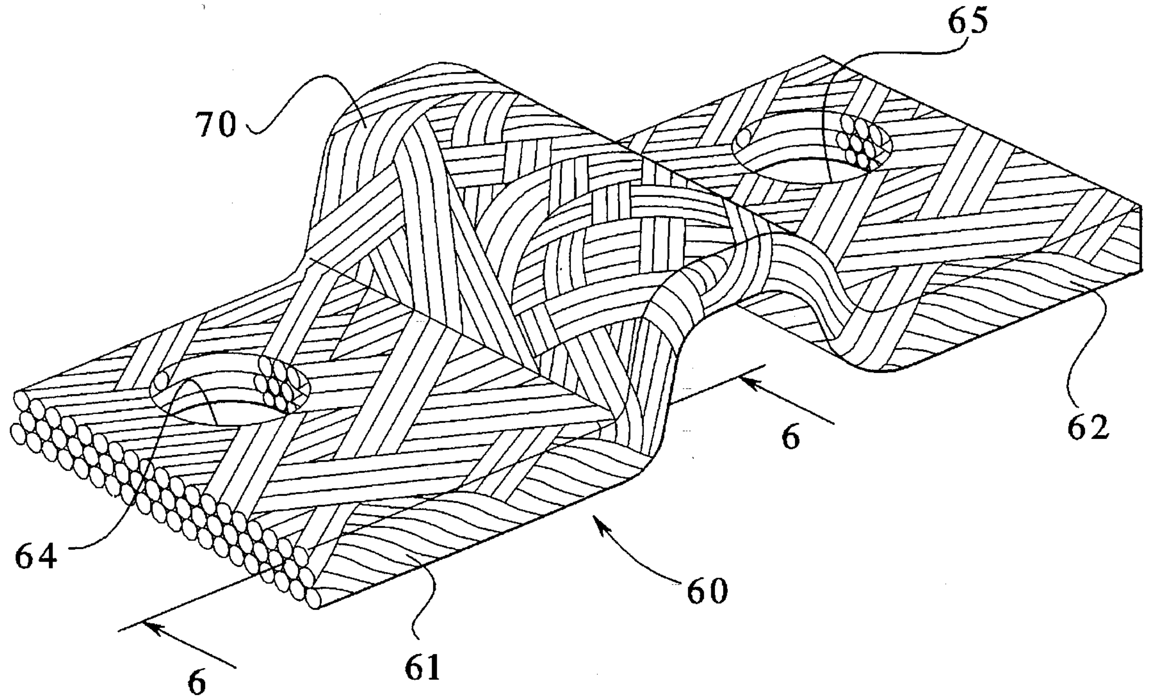
FIG. 5 is a perspective view of an alternative embodiment of a braided cable having solidified ends.

FIG. 5 discloses an alternative embodiment of the present invention. A braided cable 60 having solidified ends 61,62 includes an oxidation bump 70. The oxidation bump 70 is added to the cable in order to avoid the wicking of the solder along the length of the cable. In certain applications, ends 61,62 will be attached to a surface by soldering. In some cases, it undesirable to allow the solder to wick beyond the attachment point. Should the solder be dispersed throughout the entire cable, the flexibility of the cable is greatly reduced. Especially in the case of cables which have a short length, the solder can easily wick throughout the entire cable and limit the cable's flexibility. In a presently preferred embodiment, a cable of total length less than 0.25 inch has included an oxidation bump to ensure the flexibility of the cable.

In a preferred embodiment, the method of forming the solidified cable having an oxidation bump 70 in an automated process includes the steps of solidifying the ends 61,62 of the cable 60 as discussed previously, stamping holes 64,65 into the cable, and then adding the oxidation bump 70. The U-shaped bump 70 is formed via a punch press to extend the cable 60 in a direction beyond the plane of the ends 61,62 of the cable 60. The bump is then oxidized by placing prongs of a 1 KVA current producing machine on either side of the bump to heat up the material between the prongs until it is oxidized. The level of oxidation may be regulated by the color which the cable 60 changes to. In a preferred embodiment, a purplish color is achieved at the desired oxidation level of the cable 60. An alternative method of forming the oxidation bump 70, when done manually, includes the steps of solidifying the ends 61,62 of the cable 60 and simultaneously adding the bump, oxidizing the bump and adding holes 64,65 and trimming the cable. However, any arrangement of steps which achieves the present invention is anticipated.

Figure 6:
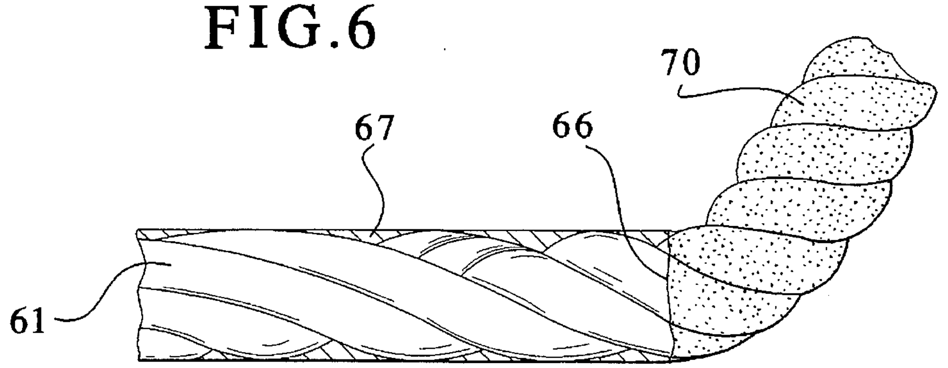
FIG. 6 is an enlarged cutaway view of FIG. 5 taken at line 6—6.

FIG. 6 is an enlarged cut-away side view of FIG. 5 taken at line 6—6. The solidified end 61 is shown after attachment to a substrate, using solder 67. It can be seen that the solder 67 has wicked or spread along the entire end portion 61. The solder, however, has not wicked onto the oxidation bump 70. Not only does the bump change the direction of the cable to make it more difficult for the solder to wick in the second direction; also the oxidation of the cable prohibits the solder from wicking along the complete length of the cable. It has been illustrated that the solder ends at line 66.

By way of example and not by limitation, the following tests are offered.

TEST 1

Initial Voltage Drop

Requirements: Voltage drop measurements shall not exceed 5 millivolts, when measured in accordance with MIL-T-13513B(AT) (Military Specification, U.S. Army Tank-Automotive Command), paragraph 4.6.3.
Procedure: The samples were connected into a circuit adjusted to pass a current of 205 amps. The millivolt drop was measured from the edge of the termination to a point on the braided cable ¼ inch inward. The voltage drop and test current values were recorded. This was done in the as received condition (cold) and after the assembly had thermally stabilized. All results are recorded in Table 1.

TABLE 1

Initial Voltage Drop

| Sample Number | Direct Current (amperes) | Voltage (mV) Max. Limit | Voltage (mV) Actual | Pass/Fail |
|---|---|---|---|---|
| 1 | 205 | 5 | 2.02 | Pass |
| 2 | 205 | 5 | 1.50 | Pass |
| 3 | 205 | 5 | 0.71 | Pass |
| 4 | 205 | 5 | 2.61 | Pass |
| 5 | 205 | 5 | 3.71 | Pass |
| 6 | 205 | 5 | 3.51 | Pass |

*Samples 1–3 are cables having solidified ends.
Samples 4–6 are cables having ferrule crimps.

Results: When the samples were tested at a test current of 205 amps and measured after thermal stabilization, they were all observed to meet the requirements of MIL-T-13513B(AT), i.e. a voltage drop of less than 5 millivolts. It was observed that the solidified end samples exhibited a lower voltage drop result than the cable having ferrule crimps.

TEST 2

Current Rating

Requirements: The temperature of the termination (solidified end or ferrule crimp) shall not exceed by more than 9° F. the temperature of the braid material, when tested as specified in MIL-T-13513B(AT), paragraph 4.6.4.
Procedure.: The assemblies were connected into a test circuit adjusted to pass 205 amps of current. The current was maintained until the temperature of the terminated ends and the splice stabilized. These stabilized temperature values were recorded. The temperature was recorded by means of a thermocouple embedded in the terminated end and also in the braided material. All results are recorded in Table 2.

TABLE 2

Current Rating

| Sample No. | Direct Current (amperes) | Temp. °F. Barrel | Temp. °F. Stranding | Barrel Stranding AT (°F.) Max. | Barrel Stranding AT (°F.) Actual | Pass/Fail |
|---|---|---|---|---|---|---|
| 1 | 205 | 99.2 | 91.8 | 9 | 7.4 | Pass |
| 2 | 205 | 014.6 | 96.6 | 9 | 8.0 | Pass |
| 3 | 205 | 100 | 100 | 9 | 0 | Pass |
| 4 | 205 | 101.2 | 91.4 | 9 | 8.8 | Pass |
| 5 | 205 | 98.3 | 91.7 | 9 | 6.6 | Pass |
| 6 | 205 | 92.1 | 89.0 | 9 | 3.1 | Pass |

*Samples 1–3 are cables having solidified ends.
Samples 4–6 are cables having ferrule crimps.

Results: All of the assemblies met the requirements of MIL-T-13513B(AT), there were no significant differences between the solidified ends vs. ferrule crimps, as far as the results of this test were concerned.

TEST 3

Current Overload and Post-Overload Voltage Drop

Requirements: The terminated end (solidified end or ferrule crimp) temperature shall not exceed by more than 18° F. the temperature of the attached braid, when tested as specified in MIL-T- 13513B(AT), paragraph 4.6.5. The subsequent post-test voltage drop measurements shall meet the requirements specified in Table 1 of MIL-T-13513B(AT), and shall be less than 8 millivolts.
Procedure: The samples were connected into a circuit so that 256 amps could pass through them. The stabilized temperatures of the terminated ends (solidified end and ferrule crimp) and the braid material were recorded. Then the samples were allowed to return to room temperature. Then, a test current of 410 amps was allowed to pass through the samples for a period of five minutes. The stabilized temperatures of the terminated ends (solidified or ferrule crimp) and of the braid material were recorded. The samples were then allowed to return to room temperature and were tested for voltage drop as indicated in the first section of this report. All results are recorded in Tables 3a–3c.

TABLE 3a

Current Overload - 125%

| Sample No. | Direct Current (amperes) | Temp. °F. Barrel | Temp. °F. Stranding | Barrel Stranding AT (°F.) Max. | Barrel Stranding AT (°F.) Actual | Pass/Fail |
|---|---|---|---|---|---|---|
| 1 | 256 | 110 | 100 | 18 | 10 | Pass |
| 2 | 256 | 122 | 108 | 18 | 14 | Pass |
| 3 | 256 | 113 | 116 | 18 | (3) | Pass |
| 4 | 256 | 122 | 104 | 18 | 18 | Pass |
| 5 | 256 | 120 | 103 | 18 | 17 | Pass |
| 6 | 256 | 102 | 102 | 18 | 0 | Pass |

*Samples 1–3 are cables having solidified ends.
Samples 4–6 are cables having ferrule crimps.

TABLE 3b

| Current Overload - 200% | | | | | | |
|---|---|---|---|---|---|---|
| Sample | Direct Current | Temp. °F. | | Barrel Stranding AT (°F.) | | Pass/ |
| No. | (amperes) | Barrel | Stranding | Max. | Actual | Fail |
| 1 | 410 | 118 | 111 | 18 | 7 | Pass |
| 2 | 410 | 128 | 113 | 18 | 15 | Pass |
| 3 | 410 | 118 | 109 | 18 | 9 | Pass |
| 4 | 410 | 123 | 110 | 18 | 13 | Pass |
| 5 | 410 | 118 | 104 | 18 | 14 | Pass |
| 6 | 410 | 103 | 106 | 18 | (−3) | Pass |

*Samples 1–3 are cables having solidified ends.
Samples 4–6 are cables having ferrule crimps.

TABLE 3c

| Post-Overload Voltage Drop | | | | |
|---|---|---|---|---|
| Sample | Direct Current | Voltage (mv) | | Pass/ |
| No. | (amperes) | Max. | Actual | Fail |
| 1 | 205 | 8 | 1.3 mv | Pass |
| 2 | 205 | 8 | 1.6 mv | Pass |
| 3 | 205 | 8 | 0.7 mv | Pass |
| 4 | 205 | 8 | 3.1 mv | Pass |
| 5 | 205 | 8 | 4.1 mv | Pass |
| 6 | 205 | 8 | 3.8 mv | Pass |

*Samples 1–3 are cables having solidified ends.
Samples 4–6 are cables having ferrule crimps.

TEST 3 continued

Results: All of the samples tested met the requirements of MIL-T-13513B(AT). There were no significant differences in the results obtained for the two types of samples, when tested for current overload. However, when the post test voltage drop measurements were made, the samples with solidified ends exhibited lower (better) voltage drop measurements than the samples with the ferrule crimp.

TEST 4

Mechanical Strength

Requirements: The terminated ends (solidified ends or ferrule crimps) shall withstand a minimum mechanical strength of 485 pounds pull force without breaking or becoming distorted to the extent of being unfit for further use. The samples shall be tested in accordance with MIL-T-13513B(AT), paragraph 4.6.6.

Procedure: The test specimens were placed in a standard tensile testing machine and a sufficient force was applied to pull the cable to its minimum force rating of 485 pounds. The condition of the assembly was examined following the application of this minimum force requirement. Testing was performed at room temperature and the speed of the test machine was 4 inches per minute. Two of the three samples of each type were tested by placing both ends of the sample in the grips of the universal test machine. One of three samples from each group was tested by placing a bolt through the pre-drilled hole in the terminated end and pulling on the bolt, while the other side was placed in the grips of a universal test machine. All results are recorded in Table 4.

TABLE 4

| Test to Minimum Force Rating of 485 lbs. | | | |
|---|---|---|---|
| Sample No. | Type | Degradation at Minimum Force Rating | Failure at Force Rating |
| 1 | Solidified | None | 554[2] |
| 2 | Solidified | None | 582[1] |
| 3 | Solidified | None | 584[2] |
| 4 | Ferrule | None | 647[2] |
| 5 | Ferrule | None | 537[1] |
| 6 | Ferrule | None | 518[2] |

[1]Lower grip secured with wedge, upper grip secured with pin and clevis.
[2]Secured between wedge grips.

TEST 4 continued

Results: All of the samples tested were pulled to a minimum force of approximately 485 pounds. There appeared to be no degradation to any of the samples tested, when pulled to this minimum force requirement.

TEST 5

Sinusoidal Vibration

Requirements: The sample shall show no evidence of mechanical or electrical failure, when tested in accordance with MIL-T-13513B (AT), paragraph 4.6.7.1, vibration. Following the vibration test, the samples shall meet the mechanical strength test requirements.

Procedure: One end of each sample was mounted on a vibration table with the other end of the sample secured to a stable support. The sample was vibrated for one hour in each of three mutually perpendicular axes at an amplitude of 0.060 inches and a frequency of 10 to 55 to 10 Hz, with the frequency range accomplished once each minute. Following vibration testing, the samples were subjected to the mechanical strength test requirements defined earlier in this report, except that the samples were pulled to failure. All results are recorded in Table 5.

TABLE 5

| Test to Failure After Sine Vibration | | | |
|---|---|---|---|
| Sample No. | Type | Degradation After Vibration | Failure at Force Rating |
| 1 | Solidified | None | 1,045 lbf[1] |
| 2 | Solidified | None | 680 lbf[2] |
| 3 | Solidified | None | 1,067 lbf[1] |
| 4 | Ferrule | None | 1,246 lbf[1] |
| 5 | Ferrule | None | 655 lbf[2] |
| 6 | Ferrule | None | 1,133 lbf[1] |

[1]Secured with pin and clevis.
[2]Secured with two wedge grips.

Results: All of the samples were subjected to, and successfully completed, the vibration test. There appeared to be no evidence of any physical degradation to any of the samples as a result of the vibration test. Following the vibration test, the samples were subjected to the mechanical strength test described in the previous section of this report. The samples were pulled to failure with a crosshead speed of one inch per minute. All of the samples broke at approximately the same force rating. The only difference was that some of the ferrule crimp samples did pull from the braid, where as the solidified end samples tended to break at the braid.

TEST 6

Torque Test

Requirements: The samples shall be checked for their ability to withstand a bolt being torqued onto them. A pre-drilled hole in the sample shall be placed over a tapped hole in an aluminum block and a bolt shall be threaded through the sample into the block. The bolt shall be torqued to a torque of 100 inch pounds. The sample shall be tested with and without washers. After each torque test, the samples shall be visually inspected for any evidence of degradation.

Procedure: The samples were tested as outlined in the requirements section above and all observations are recorded in Table 6.

TABLE 6

Torque Test Results

| Sample No. | Type | Significant Damage With Washer | Significant Damage Without Washer |
|---|---|---|---|
| 1 | Solidified | None | None |
| 2 | Solidified | None | None |
| 3 | Solidified | None | None |
| 4 | Ferrule | None | None |
| 5 | Ferrule | None | None |
| 6 | Ferrule | None | None |

Results: There was no evidence of any physical degradation to any of the samples tested, as a result of the torque test.

TEST 7

Waterproofness

Requirements: The samples, when tested as specified in MIL-T-13513B (AT), paragraph 4.6.7.2 shall show no evidence of leakage.

Procedure: Three inches of the termination end of the assembly was immersed in water, in such a manner that hydrostatic pressure could be applied. Hydrostatic pressure of six pounds per square inch was applied to the water for six hours. The cable was then cut apart for evidence of leakage through the terminated end (solidified end or ferrule crimp).

Results: The ferrule crimp sample was observed to absorb water. The solidified end sample showed no evidence of water absorption.

TEST 8

Microsections

Requirements: One solidified end assembly and one ferrule crimp assembly shall be microsectioned using standard metallographic techniques. Samples shall be placed in an acrylic mounting compound, ground, and polished. The samples shall then be visually inspected for any evidence of voiding at the termination area (solidified end or ferrule crimp). Photographs of the microsections shall be taken.

Results: The solidified crimp exhibited very little voiding in the termination area, where as the ferrule crimp assembly did have voiding in this area. Micrographs are submitted with this application.

The description above has been offered for illustrative purposes only, and it is not intended to limit the scope of the invention of this application which is defined in the following claims.

What is claimed is:

1. A flexible current carrying braided cable comprising:

a cable and an end portion of the cable being solidified via a spot welding machine at 1100° F.–2000° F. at 10–100 psi wherein said end portion is compressed into a unitary member having reduced voids and enabling attachment of said end portion to a current carrying apparatus and said Cable includes a U-shaped oxidation bump.

2. The braided cable of claim 1 wherein:

said cable has a maximum voltage drop of 2.5 mV when a current of 205 amps is passed and measured after thermal stabilization.

3. The braided cable of claim 1 wherein:

said solidified end may withstand a pull force of 485 pounds.

4. The braided cable of claim 1 wherein:

said cable having each end solidified.

5. The braided cable of claim 1 wherein:

said spot welding machine includes customized tips for solidifying said end portions.

6. A flexible current carrying braided cable comprising:

a cable having an end portion being solidified via a spot welding machine, and a U-shaped oxidation bump adjacent said end portion.

7. The braided cable of claim 6 wherein said oxidation bump is a U-shaped indentation of said cable.

8. The braided cable of claim 6 wherein said end portion is compressed into a unitary member having reducing voids and enabling attachment of said end portion to a current carrying apparatus.

9. The braided cable of claim 6 wherein said end portion is waterproof.

10. A method of forming a braided cable having a solidified end comprising the steps of:

inserting an end portion of a cable into a spot welding machine;

solidifying the end portion of the cable via a spot welding machine at 1,100° F.–2,000° F. at 10–100 psi;

forming a U-shaped bump to the cable; and oxidizing said bump.

11. The method of solidifying a braided cable of claim 10 wherein:

said spot welding machine is calibrated via a thermo feedback control unit.

12. The method of solidifying a braided cable of claim 10 wherein:

said end portion is solidified via a customized tip of the spot welding machine.

13. The method of solidifying a braided cable of claim 10 wherein oxidation of said bump is caused by the application of two prongs to the sides of said bump and heating said bump to a specified temperature.

* * * * *

UNITED STATES PATENT AND TRADEMARK OFFICE

CERTIFICATE OF CORRECTION

PATENT NO. : 5,541,380

DATED : July 30, 1996

INVENTOR(S) : Christopher Ogden, et al

It is certified that error appears in the above-indentified patent and that said Letters Patent is hereby corrected as shown below:

On the title page, item [75], Inventors: "Dennis Lindsay" should read --Dennis Lindsey --.

Signed and Sealed this

Twelfth Day of November, 1996

Attest:

BRUCE LEHMAN

*Attesting Officer* *Commissioner of Patents and Trademarks*